Figure 1:
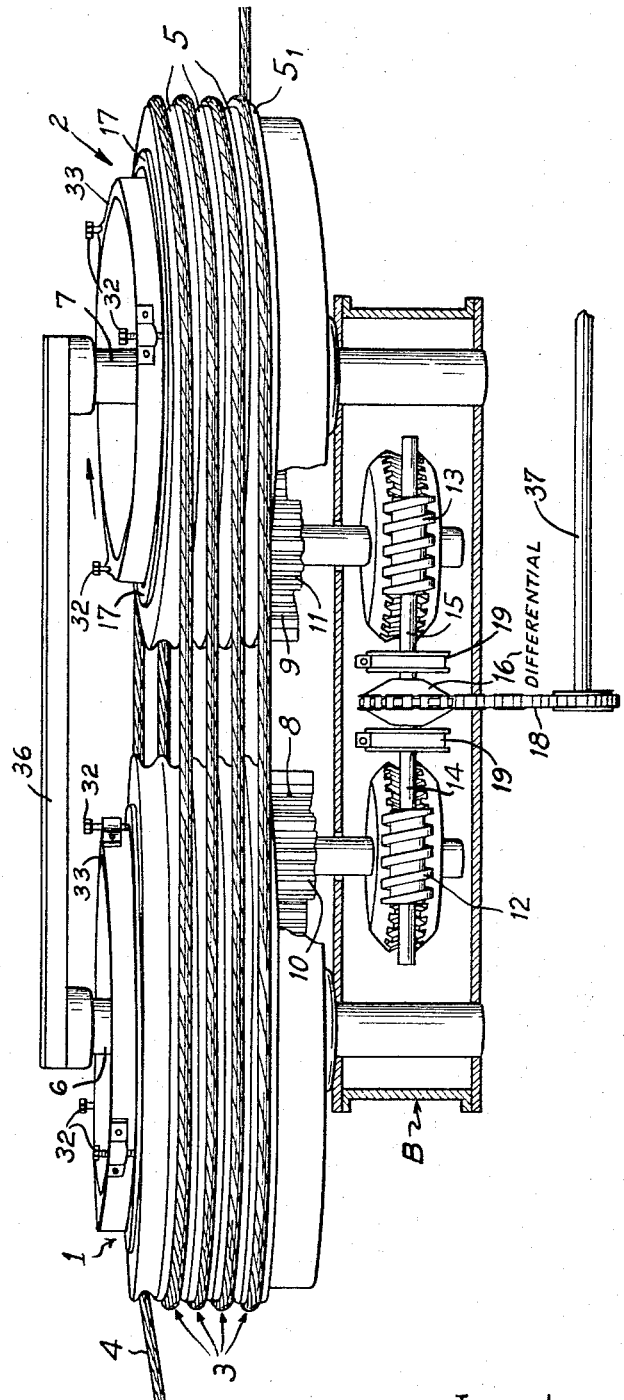

Dec. 20, 1966   A. H. A. TILLOY   3,292,873
WINCHES FOR PAYING OUT CABLES
Filed July 29, 1964   3 Sheets-Sheet 1

Inventor
ANDRÉ H. A. TILLOY
By Holcombe, Wetherill & Brisebois
Attorneys

Dec. 20, 1966    A. H. A. TILLOY    3,292,873
WINCHES FOR PAYING OUT CABLES
Filed July 29, 1964    3 Sheets-Sheet 3

INVENTOR
A. H. A. Tilloy
By Holcombe Wetherill Brisebois
ATTORNEYS

United States Patent Office 3,292,873
Patented Dec. 20, 1966

3,292,873
WINCHES FOR PAYING OUT CABLES
André Henri Antoine Tilloy, Versailles, France, assignor to Societe Generale d'Entreprises, Colombes, France, a corporation of France
Filed July 29, 1964, Ser. No. 386,009
Claims priority, application France, July 31, 1963, 943,392
7 Claims. (Cl. 242—47.09)

The invention relates to apparatus for paying out electrical cables under tension in order to avoid their dragging on the ground and being damaged during such paying out, and has for an object improvements in such apparatus.

In French Patent 1,001,754 filed on December 1, 1949, by Societe Generale d'Enterprises, there is described apparatus comprising two drums having parallel axes each comprising a plurality of grooved discs secured together by the effect of friction, said drums being held back by means of a braking device for maintaining tension on the cable during unwinding. The advantage obtained by the fact that the drums are constituted by discs coupled together by the effect of friction is that the sliding of the cable in the grooves of the discs is replaced by a sliding of the discs upon one another, thus avoiding the rapid wear and tear of the base of the grooves and in particular the jerking caused by the loss of adhesion due to the progressive extension of the cable.

The invention has for a particular object to replace the braking device retaining each drum, in an arrangement according to the aforesaid French Patent, by a mechanical device allowing the rotation of the drum at the speed required to be positively controlled in order to ensure that the cable is unwound while being maintained under tension.

The apparatus thus constituted is thus a paying out winch, rather than a paying out brake of the type described in the abovementioned patent.

It is a further object of the invention to provide paying out apparatus of this kind in which each drum comprises a toothed wheel engaging with a pinion located at the output of a reduction gear which is itself controlled by a driving shaft, the assembly transmitting to the drums the speed of rotation desired for the paying out under tension of the cable passing on said drums.

It is yet a further object of the invention to provide a mechanism for regulating, during operation, the pressure exerted on the rings of the disc constituting the drums in order to cause variations in the friction retaining said discs in rotation.

Figure 2:
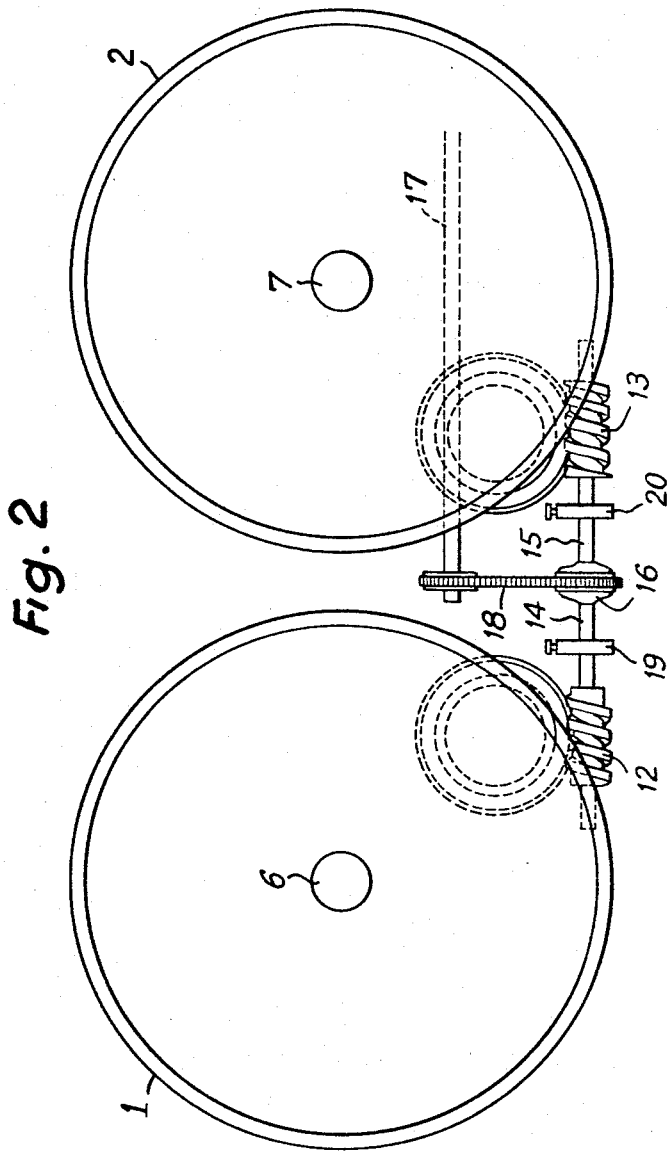
Figure 3:
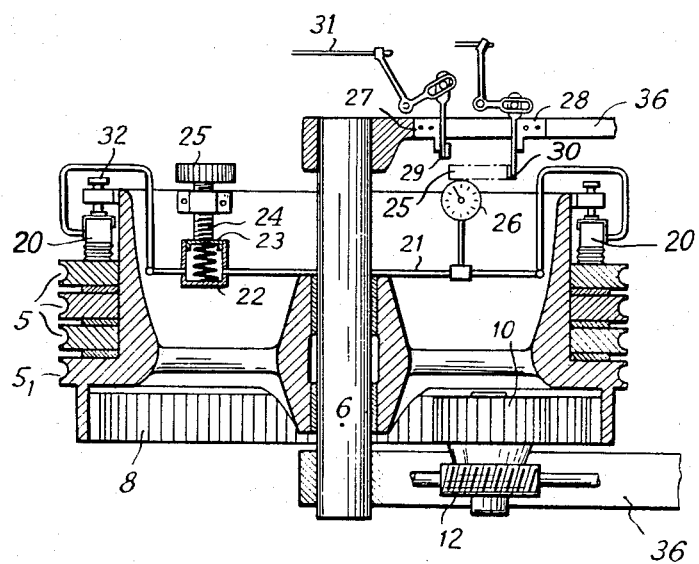

In order that the invention may be more clearly understood, reference will now be made to the accompanying drawings which show two embodiments thereof by way of example, and in which:

FIGURE 1 is an elevational view, partly in section, showing a first embodiment of a paying out winch according to the invention, FIGURE 2 is a diagrammatical plan view of the arrangement of FIGURE 1, the cable having been omitted in order to clarify the drawing, and FIGURE 3 is a partial elevational sectional view for a second embodiment showing the mechanism for the adjustment of the friction of the rings for one of the drums of the paying out apparatus.

The paying out winch shown in these drawings may be assembled on a carrier vehicle, the motor of which serves either on the one hand for movement in order to locate it on a gantry, and on the other hand to control the speed of rotation of the paying out drums, the vehicle being provided with suitable securing devices which in this latter case ensure its immobilisation in the operational position.

The paying out device comprises two drums, 1–2, each having a plurality of grooves 3 through which the cable 4 passes under slight tension and is streached progressively from one groove to the next and leaves it under a tension which allows it to be raised above the ground and obstacles. The tension at which the cable enters the drum and its regularity are ensured by a brake regulator coupled to the cable capstan (not shown). The sheaves of the drums are provided on the periphery with rings 5 independent of one another but applied laterally together by means of pressure screws acting upon an external pressure rim 17 in order to be braked by suitable friction during rotation of the drums. Each sheave in which the cable adheres without sliding is accompanied in its movement by the drum but this latter at a speed which is very slightly less, so as to brake it. This machine thus effects the retaining and the paying out of the cable as slowly as desired, jerks being avoided by the relative braked sliding of the sheaves carrying the cable. In each drum, the last sheave $5_1$ is secured to or integral with its drum.

The shaft 6 of the first drum 1 is vertical and the second 7 is slightly inclined in the vertical plane of its shaft parallel to the vertical plane of the axis of the shaft 6, in order to ensure the passage of the cable from one groove to the next in a helical manner without jerking (see FIGURE 1). The shafts 6–7 are held in a frame B.

Each drum carries at its base a wheel 8–9 having pronounced internal identation, each wheel being driven by a pinion 10–11 mounted on an output shaft of a screw reduction gear 12–13. The two screws of the screw reduction gear are keyed to two half shafts 14–15 located in line and coupled on either side by a differential gear 16 receiving its movement from a control shaft 37 by means of a chain transmission 18. The function of the differential 16 is to absorb the differences in the speeds of rotation of the two drums 1–2 which are due particularly to the difference in speed of the rings of the drums resulting from the extension of the cable discharge from each drum as a result of the increase in tension and also to the difference in diameter of the grooves which may be the result of wear.

A manually controlled safety brake 19—19 (FIGURE 2) is mounted on each of the two half shafts 14–15 of the screw reducing gears. This brake acts directly upon the movement of the screws 12–13 and ensures the reliable braking of each drum when it is stopped, the screws themselves also being non-reversing.

In order to pay out a cable with the apparatus above-described, the cable coming from the spool is first of all wound upon the revolving drums 1–2 and its end is then attached to a small towing cable, the other end of which passes into a towing winch. The winch draws the small cable in order to stretch it and raise it off the ground. The brakes 19—19 which have been locked while the small cable was being stretched are then released and the paying out means is then actuated by coupling its control shaft. The assembly of the transmission described transmits to the drums a speed of rotation which is accurately controlled by the speed of the control motor which is controlled by an operator in order to ensure the positive unwinding of the cable while being maintained under tension so that it does not drag on the ground. The paying out of the cable must be effected at constant speed and smoothly without jerks in accordance with the speed of the towing cable.

In the embodiment above-mentioned referring to FIGURES 1 and 2 the rings 5 constituting the side surfaces of the drums 1 and 2 are applied together by means of pressure screws 32 mounted on the inner parts 33 of the drums 1–2 and acting upon a compression ring 17 (FIGURE 1) located laterally on the external surface of the upper ring. The pressure thus exerted on the rings 5 is advantageously regular. It is also advantageous that the value of this pressure be controllable. Upon this value depends the correct operation of the friction rings and the good grip of the cable. The value varies according to the nature of the cable and the tension which it is desired to transmit to the cable to be paid out.

During paying out of the cable, it may be necessary to increase or decrease the pressure exerted on the rings 5 as a result of observation of the behaviour of the cable and the friction ring.

The value of the pressure exerted by means of the screws is determined by theoretical calculations but must be accurately adjusted in the course of operation and it is desirable that this adjustment be effected without stopping the paying out operation.

It is possible to obtain this result by means of the following hydraulic device shown in FIGURE 3 for one of the drums, the other drum being equipped in the same manner. The pressure screws do not act directly upon a friction rim such as 17 of FIGURE 1 but each serve as an adjustable support for an oil pressure receiver cylinder 20 having a piston.

All the pressure cylinders 20 are interconnected by means of a conduit 21 the pressure of which is controlled by a master cylinder 22 and which may be supplied with oil from a small reservoir. A manometer 26 is connected to the conduit 21.

The predetermined pressure is effected in the conduit and in the receiver cylinders by the master cylinder 22, the piston 23 of which is controlled by a screw 24.

The master cylinder 22 and its compression screws 24 are secured against the internal rim of each drum of the paying out device, their axes being parallel to the axis 6-7 of each drums.

The head of the compression screw of this master cylinder is a toothed pinion 25.

When the conduit 21 is full and all air removed, it is possible to make manual adjustment by means of the screw 24 of the master cylinder 22 of the desired pressure on the friction rings, said pressure being controlled by the manometer 26. The whole assembly which is fixed with respect to the drum thus turns with the drum.

The upper cross-piece of the frame 36 which interconnects the shaft 6 and 7 of the drum carries two sliding supports 27-28 on each of which is able to rise or fall a lug carrying a pin or a small toothed section 29-30.

These pins or sections are located in such a manner that in their lower position they are met by the toothed pinion 25 forming the head of the pressure screw 24 of the master cylinder 22, when pinion 25 reaches the dotted position.

The sliding pins 29-30 are located on the fixed cross piece and may thus be operated from the control unit by means of a wire or a flexible transmission 31.

According to the direction of rotation of the drum one of the pins may lock and the other unlock the pressure screw 24, and each time one of the pins comes into contact with the pinion 25 it causes the screw to rotate by an angle equal to one or more teeth of the pinion.

Since each drum is thus provided with its device the pressure on the friction rims may thus be made perfectly equal on each individually and may be adjusted in the course of operation, using a manometer.

The pre-adjustment screw 32 of the receiver cylinders 20 may be omitted if desired.

The invention is of course not strictly limited to the embodiment herein described with reference to the drawings and modifications thereof may easily be conceived on the basis of these embodiments.

I claim:
1. A cable paying out winch comprising two drums in the form of rings, means for coupling said rings together by the action of friction, the cable to be unwound being wound on said rings, a toothed wheel on each of said drums, two reducing gears, a pinion located at the output of each of said reducing gears, a driving shaft connected to each reducing gear, said toothed wheels and said pinions being in engagement, the assembly positively transmitting to the drums the speed of the rotation required in order to ensure the unwinding of the cable and its maintaining under tension and a differential mechanism between said driving shaft and said reducing gear of each drum to absorb the difference in speed of rotation of the two drums.

2. A winch as claimed in claim 1, wherein a safety brake is connected to each of said reducing gears in order to immobilise the drums when not rotating.

3. A winch as claimed in claim 1, wherein the axes of said drums are inclined with respect to one another.

4. A winch as claimed in claim 1, comprising means for adjustment of the pressure exerted on said rings constituted by said drums during operation, in order to vary the friction braking said rings during rotation.

5. A winch as claimed in claim 4, wherein said means for adjustment comprises pressure members mounted on said drums and rotating therewith, a control member distributing pressure in said pressure members and withdrawable members mounted upon said frame and coming into contact at each rotation of said drum with said control member to adjust said control member.

6. A winch as claimed in claim 5, wherein the pressure members acting upon said rings are constituted by a plurality of pressure cylinders distributed about the drums and receiving the pressure from a master cylinder, a piston in said master cylinder, a screw for exerting thrust on said piston, and said withdrawable member rotating said screw at each rotation of said drum.

7. A winch as claimed in claim 6, wherein a toothed pinion is integral with or secured to the screw of said master cylinder and is located to contact said withdrawable pins mounted on said frame at each rotation of said drum.

References Cited by the Examiner

UNITED STATES PATENTS 2,034,657 3/1936 Hartmann et al. ____ 242—47.09
2,948,483 8/1960 Petersen _____ 242—155

FOREIGN PATENTS 703,919 2/1954 Great Britain.

STANLEY N. GILREATH, *Primary Examiner.*

MERVIN STEIN, *Examiner.*

N. L. MINTZ, *Assistant Examiner.*